(12) United States Patent
Liebsch

(10) Patent No.: US 10,843,239 B2
(45) Date of Patent: Nov. 24, 2020

(54) WEIGHING FUME CUPBOARD WITH A WORK SURFACE THAT IS VIBRATIONALY ISOLATED FROM THE REST OF THE HOUSING

(71) Applicant: Waldner AG, St. Gallen (CH)

(72) Inventor: Jürgen Liebsch, Lindenberg Bayern (DE)

(73) Assignee: Waldner AG

( * ) Notice: Subject to any disclaimer, the term of this patent is extended or adjusted under 35 U.S.C. 154(b) by 339 days.

(21) Appl. No.: 15/558,975

(22) PCT Filed: Feb. 15, 2016

(86) PCT No.: PCT/EP2016/053118
§ 371 (c)(1),
(2) Date: Feb. 23, 2018

(87) PCT Pub. No.: WO2016/146315
PCT Pub. Date: Sep. 22, 2016

(65) Prior Publication Data
US 2018/0161835 A1    Jun. 14, 2018

(30) Foreign Application Priority Data

Mar. 15, 2015   (DE) .................. 10 2015 103 766

(51) Int. Cl.
*G01G 21/30*   (2006.01)
*B25H 1/20*    (2006.01)
(Continued)

(52) U.S. Cl.
CPC .............. *B08B 15/023* (2013.01); *B01L 1/00* (2013.01); *B01L 1/04* (2013.01); *B25H 1/20* (2013.01);
(Continued)

(58) Field of Classification Search
CPC . B08B 15/023; B01L 1/00; B01L 1/04; B01L 2200/082; B01L 2200/141;
(Continued)

(56) References Cited

U.S. PATENT DOCUMENTS 4,893,686 A * 1/1990 Chretien .............. G01G 21/286
177/180
5,141,066 A * 8/1992 Strickler ................ G01G 21/28
177/210 EM
(Continued)

FOREIGN PATENT DOCUMENTS

DE    2631924    1/1978
DE    10042437   3/2002
(Continued)

OTHER PUBLICATIONS

PCT International Search Report, PCT/EP2016/053118, dated Apr. 29, 2016, 3 pages.
(Continued)

*Primary Examiner* — Randy W Gibson
(74) *Attorney, Agent, or Firm* — Quarles & Brady LLP

(57) ABSTRACT

A weighing fume cupboard (1) for weighing pharmaceutically active or toxic substances in a laboratory, comprising a housing (10) which defines a working space (19), wherein a front side of the housing (10) has a working opening (11) which is open at all times during intended use of the weighing fume cupboard (1), a working plate (20) which delimits the working space (19) at the bottom side, an armrest (40) in the region of the working opening (11), and a support (30) which bears the weight of the housing (10), of the working plate (20) and of the armrest (40), wherein, during intended use of the weighing fume cupboard, the
(Continued)

working plate (20) is decoupled in terms of shocks and vibrations from the housing (10), from the armrest (40) and from the support (30).

11 Claims, 9 Drawing Sheets

(51) Int. Cl.
    *B08B 15/02*    (2006.01)
    *B01L 1/04*    (2006.01)
    *G01G 21/28*    (2006.01)
    *B01L 1/00*    (2006.01)

(52) U.S. Cl.
    CPC ...... *G01G 21/286* (2013.01); *B01L 2200/082* (2013.01); *B01L 2200/087* (2013.01); *B01L 2200/141* (2013.01); *G01G 21/30* (2013.01)

(58) Field of Classification Search
    CPC ........ B25H 1/20; G01G 21/28; G01G 21/286; G01G 21/30; G01G 23/06
    See application file for complete search history.

(56) References Cited

U.S. PATENT DOCUMENTS

| | | |
|---|---|---|
| 6,734,398 B1 | 5/2004 | Cecchi |
| 2008/0258365 A1 | 10/2008 | Van De Sande et al. |
| 2012/0125697 A1* | 5/2012 | Lauer .................. G01G 21/28 177/1 |
| 2013/0068542 A1* | 3/2013 | Izumo .................. G01G 21/286 177/25.12 |

FOREIGN PATENT DOCUMENTS

| | | |
|---|---|---|
| DE | 102011000429 | 8/2012 |
| EP | 0917910 | 5/1999 |
| EP | 1312871 | 5/2003 |
| EP | 2230494 | 9/2010 |
| JP | S58206930 A | 12/1983 |
| JP | 2001025387 A | 1/2001 |

OTHER PUBLICATIONS

PCT Written Opinion, PCT/EP2016/053118, dated Apr. 29, 2016, 7 pages.

* cited by examiner

WEIGHING FUME CUPBOARD WITH A WORK SURFACE THAT IS VIBRATIONALY ISOLATED FROM THE REST OF THE HOUSING

This application represents the national stage entry of PCT International Application PCT/EP2016/053118 filed Feb. 15, 2016, which claims benefit of German Application 102015103766.1 filed Mar. 15, 2015, all of which is incorporated herein in its entirety by reference.

The present invention relates to a weighing hood for weighing pharmaceutically active and toxic substances in a laboratory.

The pharmaceutical and chemical industries have created effective medicines and preparations through intensive development work, which remain effective for longer periods of time despite at lower concentrations. As a result, even the smallest amounts of active or toxic substances are potentially dangerous for researchers and laboratory technicians working with them.

The weighing process, in which such substances are handled "in the open," and proportioned using high-precision scales (precision up to 0.001 mg), involves serious risks, because particles invisible to the naked eye, frequently smaller than 10 μm, are released into the air by such substances, and can thus contaminate laboratory personnel through the air.

Weighing hoods are used in the weighing process to protect laboratory technicians, which have a ventilated and vented chamber that can be accessed from the front by the laboratory technician via a work opening. While sitting or standing, the laboratory technician inserts his forearm into the work chamber, usually resting it on an armrest, and thus handles the laboratory utensils and substances located on the work surface. These utensils include the aforementioned high-precision laboratory scales, as well as containers in which the various substances that are to be portioned are located, and further work devices such as a spatula, for retrieving the substances from the containers and placing them in weighing boats on the laboratory scale. After weighing the substances, they may then be transferred to another container.

The disadvantage with conventional weighing hoods is that external effects such as air turbulence or mechanical vibrations may affect the extremely high-precision scales, and thus have an effect on the weighing results. But even scales operated in the air circulation mode, thus those not connected to the building exhaust air system, instead having an autonomous filter system and their own ventilator, which vacuums off the air from the work chamber, feeding it through the filter system, and then returning the purified air to the laboratory space, frequently have the disadvantage that vibrations from the ventilator can have an effect on the weighing results. The weighing results are thus not necessary consistent and reproducible.

Likewise, the ergonomics of conventional weighing hoods are not always conducive to a very relaxed and substantially non-fatiguing work. Moreover, for reasons of occupational hygiene it is important that weighing hoods can be easily cleaned and decontaminated. This is not always the case with conventional weighing hoods, due to the areas that are often difficult to access because of the construction thereof. Furthermore, changing the filters in weighing hoods operated in the air circulation mode also involves the danger that hazardous substances may be released from the filters, and the laboratory technician may come in contact with them.

One object of the present invention is therefore to eliminate the disadvantages of the prior art, or at least to minimize them, and furthermore, to obtain advantages that cannot be obtained with conventional weighing hoods.

This object is achieved by the combination of features in the independent claim 1. Optional or advantageous features of the invention are given in the dependent Claims.

According to a preferred embodiment of the invention, a weighing hood for weighing pharmaceutically active or toxic substances in a laboratory comprises a housing that defines a work space, wherein a front surface of the housing has a work opening that is always open in an intended use of the weighing hood, a work surface that delimits the floor of the work space, an armrest in the region of the work opening, and a support, which supports the weight of the housing, the work surface, and the armrest, wherein the work surface is decoupled from the housing, the armrest, and the support in terms of impact and vibration in an intended use of the weighing hood.

There is preferably no direct contact between the work surface and (i) the housing, (ii) the armrest, and (iii) the support.

It is more preferable when there is no releasable force-fitting, form-fitting, or substance-bonding connection between the work surface and (i) the housing, (ii) the armrest, and (iii) the support.

According to a further advantageous embodiment of the invention, the work surface lies exclusively on the support such that it is decoupled from impacts and vibrations.

It is more advantageous when at least one resilient element is provided between the support and the work surface, on which the work surface rests.

The resilient element is preferably produced from rubber or an elastic plastic.

More preferably, the support is configured such that it provides a 3-point or 4-point support for the work surface.

According to a preferred embodiment of the invention, the work surface is monolithic, and has a weight in a range of 40 kg to 60 kg.

The housing and the armrest preferably lie exclusively on the support.

Furthermore, the support preferably has at least one brace, and the resilient element is disposed between the brace and the work surface, wherein the brace is disposed such that a work area of the work surface lying on the resilient element is flush with a surface of the support.

It is furthermore preferred that an elastic joint seal is provided along the lateral and rear circumference of the work surface.

The invention shall now be described by way of example based on a preferred embodiment, with reference to the attached Figures. Therein:

For greater understanding of the Figures and their sectional views, as well as the corresponding descriptions of the Figures, a Cartesian coordinate system is included in some of the Figures. As long as it is not otherwise indicated, the x-axis extends along the width, and the y-axis extends along the depth, and the z-axis extends along the height of the weighing hood.

Even though all of the aspects described herein relate to a weighing hood that is operated in the circulating air mode, at least some of these aspects could also be used in a weighing hood that is operated in an exhaust air mode.

When exhaust air is being referred to in the following description, this refers to that air that is discharged from the work space of the weighing hood and then fed into an exhaust air filter system for purifying purposes. With a weighing hood that is operated in the exhaust air mode, i.e. a weighing hood that is connected to a building exhaust air system, air must be discharged from the work space and filtered, before it is allowed to enter the atmosphere in the building.

Thus, the only difference is that with the exemplary embodiment described herein, the discharged and filtered exhaust air is returned thereto with the aid of a ventilator in the laboratory space in which the weighing hood is installed, while with a weighing hood operated in the exhaust air mode, the exhaust air is discharged into the atmosphere through an exhaust air duct installed in the building, in which duct the exhaust air filter is usually installed.

Moreover, it should be noted that some of the aspects described herein can also be used in a closed isolator or containment system. An isolator or containment system is a closed hood, the front surface of which does not have a work opening that is always open, but rather, two openings are provided on its front surface, which are sealed off from the interior within the work space by means of two gloves, normally made of rubber. The laboratory technician reaches, so to speak, with his hands through the openings, consequently sliding the work gloves on. In contrast to such closed isolators or containment systems, the weighing hood described herein is open because it has an opening that is always open.

Figure 1:
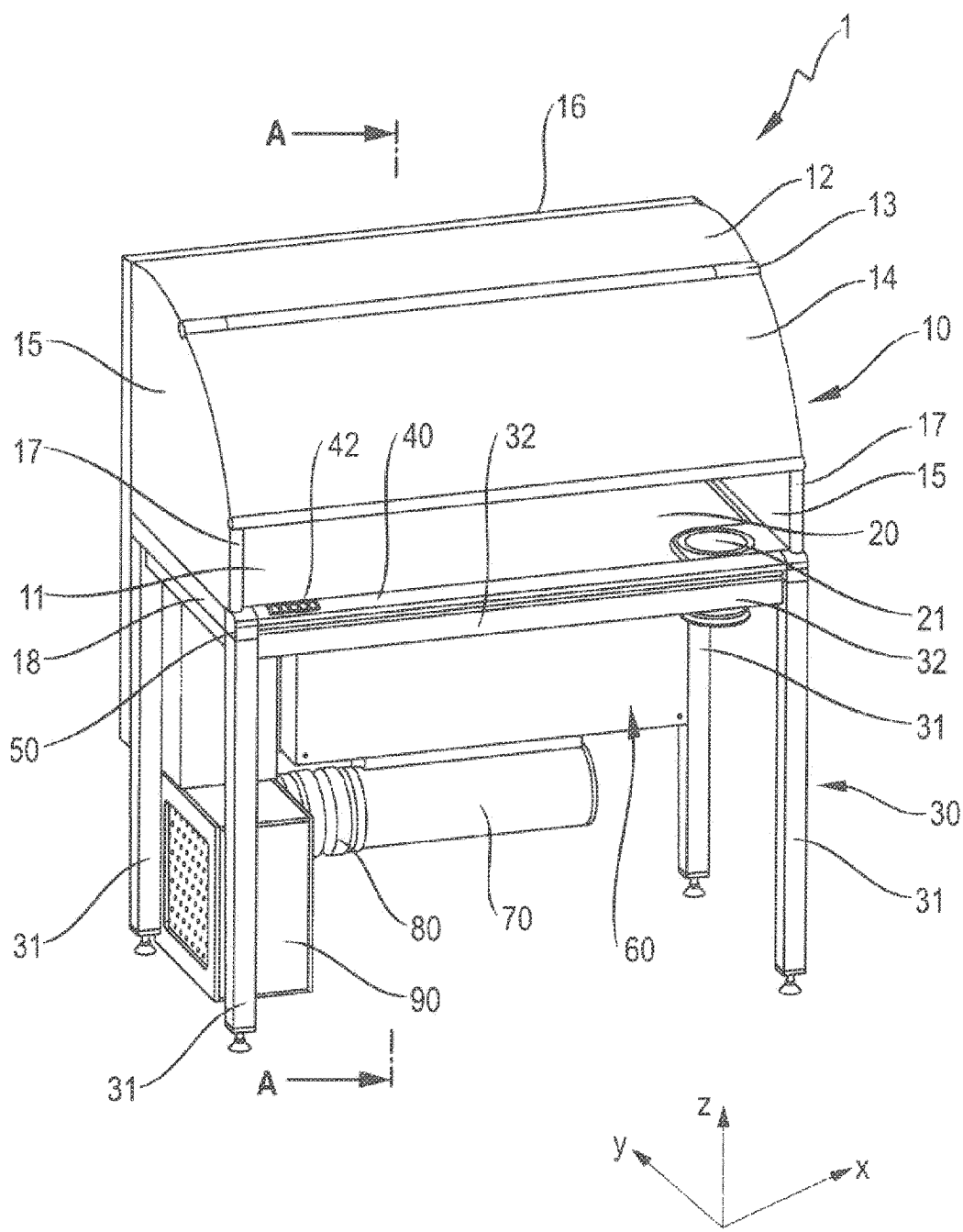
FIG. 1 shows a perspective front view of a weighing hood according to the invention.

The weighing hood 1 illustrated in FIG. 1 preferably comprises, substantially, the following components: a housing 10, a work surface 20, a support 30, an armrest 40, a filter system 60, a ventilator 70, and an exhaust outlet 90, which is preferably connected to the ventilator 70 via a hose 80.

The support 30, which is preferably designed as a counter framework, comprises four legs 31 in the exemplary embodiment shown here, each of which is provided with a leveling means at the foot end, which is not described in greater detail. This leveling means is advantageous when the floor on which the weighing hood 1 is placed has any irregularities, such that a wobbling of the overall hood 1 can be prevented with the use of one or more leveling means.

The legs 31 are interconnected by cross braces 32 for reasons of stability, which extend along either the width (x-axis) and/or the depth (y-axis). As shall be described in greater detail in reference to FIG. 5 and FIG. 6, a work surface 20 bears on the support 30. This can be obtained with a 3-point bearing or with a 4-point bearing, as is shown in the Figures. The housing 10 is likewise located on the support 30. The support 30 thus supports the weight of the housing 10, the work surface 20, and the armrest 40. In the exemplary embodiment shown in FIG. 1, the support 30 preferably also supports the weight of the exhaust or circulation air filter system 60, as well as the ventilator 70 and the hose 80.

The housing 10, which delimits a work space 19, comprises a double walled 16a, 16b deflector wall 16 at the rear of the work space 19. A hollow chamber 16c (FIG. 2) is located inside the double walled deflector wall 16, through which the exhaust air is fed toward the exhaust air filter system 60. The housing 10 has two lateral walls 15 as lateral boundaries, as well as an upper part 12 on the front, or upper, surface, and a front plate 14 that can be folded upward. The lateral walls 15, which can preferably also serve as lateral covers for the deflector wall 16, and the upper part 12, are permanently connected to the deflector wall 16 (16a or 16b), while the front plate 14 is pivotably, or rotatably, connected to the upper part by means of a hinge 13.

The front plate 14 is shown in the closed position in FIG. 1. It can, however, be pivoted from this closed position into an open position, by means of which any utensils needed in the weighing hood can be brought into the work space 19, and placed on the work surface 20. These utensils include, e.g., high-precision laboratory scales, containers containing substances that are to be weighed, and further containers, into which a weight substance is ultimately transferred. Moreover, smaller utensils, such as work gloves, spatulas, weighing boats and suchlike, are also normally used in such weighing hoods.

A work opening 11 that is always open in an intended use of the weighing hood 1 is disposed below the pivotable front plate 14. The laboratory technician obtains access to the work space 19 through this work opening 11. Normally, the laboratory technician is seated in front of the weighing hood 1, wherein the seated position is such that the work opening 11 is at the height of the slightly bent forearm of the laboratory technician, such that he can conduct his work in the work space 19 ergonomically. He observes his work through the transparent front plate 14 in this sitting position. In order to enable a good overall visibility of what takes place in the work space 19, the lateral walls 15 as well as the upper part 12 are preferably also transparent. The front plate 14, the upper part 12 and the lateral walls 15 are preferably made of acrylic glass.

Figure 2:
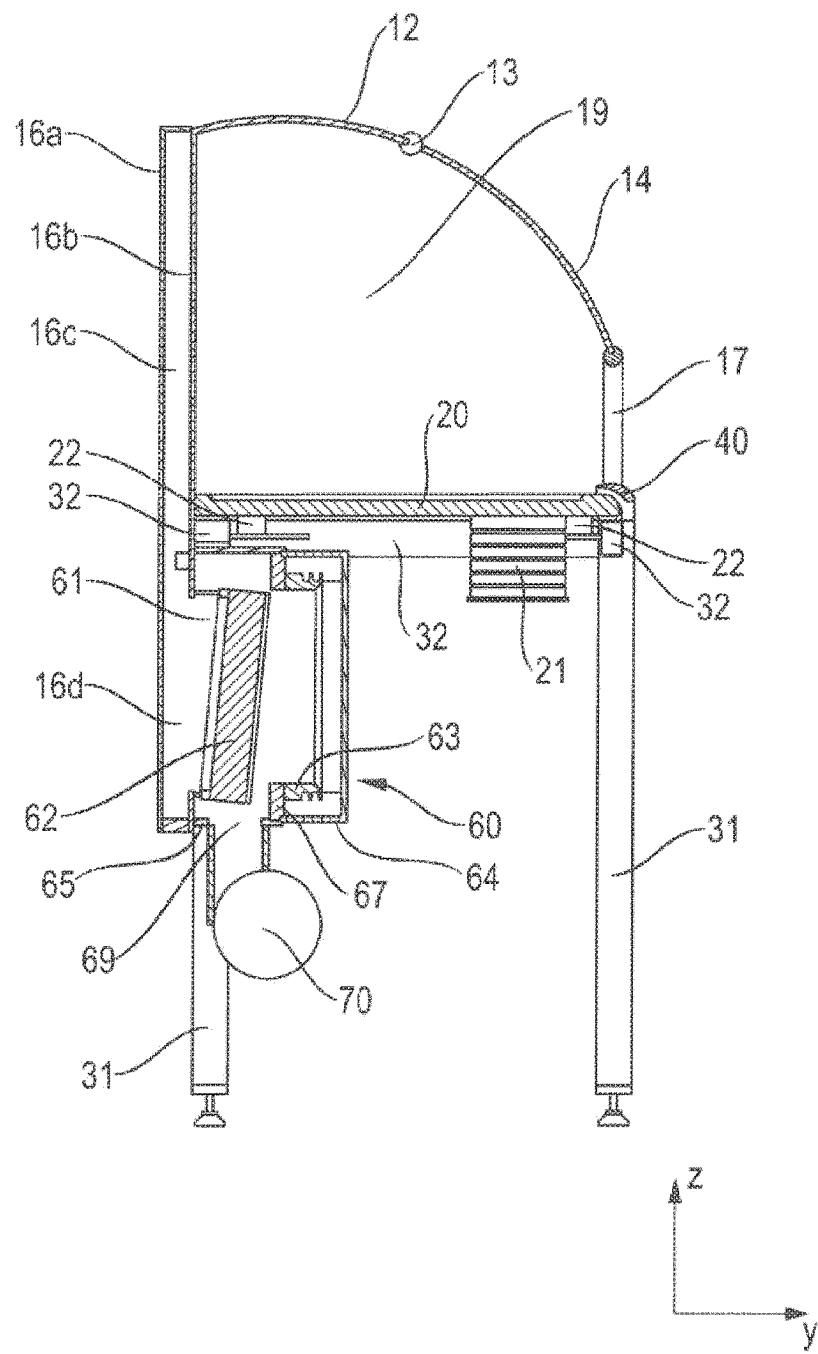
FIG. 2 shows a sectional view cut along the line A-A in FIG. 1.

In order to provide the laboratory technician with a view of the work devices and utensils located on the work surface 20 with as little reflection as possible, which in turn contributes to a non-fatiguing working with the weighing hood 1, the front plate 14, as can be seen in FIG. 2, is curved in a convex manner. The curvature is preferably constant, such that the contour of the front plate 14 corresponds to a circle segment. The upper part 12 is likewise preferably curved in a convex manner. The curvature radius of the front plate 14 preferably corresponds to the curvature radius of the upper part 12.

To facilitate the opening of the front plate 14, the lower edge of the front plate 14 has a bead, which preferably has a round cross section (y-axis). When the front plate 14 is closed, this bead rests against a bead-like vertical column 17 having the same diameter, disposed on the front edge of the lateral walls 15, which is enlarged in relation to these lateral walls, and which has a convex recess on an upper end surface, in which the bead of the front plate 14 lies. In other words, the convex curvature of the bead at the lower end of the front plate 14 corresponds to the curvature of the concave recess at the upper end of the bead 17 on the lateral wall 15.

An armrest 40 is provided in the region of the work opening 11, which can also be referred to as an inflow profile combined with an armrest function, on which the laboratory technician can rest his forearm while working in order that he can conduct his work with as little fatigue as possible and with a steady hand. The armrest 40 extends over nearly the entire width (x-axis) of the work space 19 thereby. As can be seen in reference to FIG. 7, a control and/or display panel is located on the armrest 40 and integrated therein, via which the laboratory technician can control important functions of the weighing hood 1, and/or which displays important operating states of the weighing hood to the laboratory technician.

An air passage, which is difficult to see in FIG. 1, is provided between the lower surface of the armrest 40 and the work surface 20. Room air, or ambient air, can flow through this air access into the work space 19 due to the vacuum prevalent in the work space 19. Furthermore, the inflowing ambient air in the region of the front edge of the work surface 20 also causes the air located in the vicinity of the surface of the work surface to move and be evacuated toward the deflector wall 16, in which there are slotted openings (not shown). Thus, floor-streams, so to speak, are generated along the work surface 20, which aid in evacuating heavy gases or aerosols in the region of the work surface 20. Through this additional air supply, the ventilator 70, to be described below, does not have to exert as much suction in order to generate the same amount of air circulation (or amount of exhaust air in a weighing hood operated in an exhaust air mode).

In order to allow the air supply to flow into the work space 19 through the gap between the armrest 40 and the work surface 20 with as little turbulence as possible, the front edge of the work surface 20 is designed in a flow-optimized and convex manner. The armrest 40 is also designed in a flow-optimized manner at its undersurface facing the work surface 20 as well as at its surface facing the work opening 11. As can be seen in FIG. 2, the cross section profile of the armrest 40 corresponds to an airfoil. As a result, during the operation of the weighing hood 1, not only the ambient air flowing in through the air passage beneath the armrest 40, but also the ambient air flowing in through the work opening 11, can flow into the work space 19 substantially without turbulence, and in a laminar manner.

A disposal system integrated in the work surface 20 can likewise be seen in FIG. 1, which is merely indicated by a cylindrical nozzle 21 in FIG. 1 and FIG. 2. For this, a connection nozzle 21 is integrated in the work surface 20, which is flush with the surface of the work surface 20 in the work space 19, and protrudes downward toward the support 30. Waste material accumulated while work is conducted in the weighing hood, e.g. packaging material or work gloves, can be ergonomically and conveniently, and reliably disposed of in a downward direction, exploiting gravity, through the thus resulting opening, which can preferably be closed with a removable lid. Because waste material of this type frequently comes in contact with the toxic substances handled in the work space 19, these must be disposed of inside the work space 19 without contamination, and cannot be removed from the work space 19 through the work opening 11, let alone through the front plate 14 when it is open, and disposed of with the rest of the waste material accumulated in the laboratory space. The downward protruding connection nozzle 21 is provided with numerous annular grooves on its outer contour, which are used for attaching waste bags (not shown in the Figures) made of plastic by means of O-rings. The waste bags can be individual sacks with a closed bottom, or continuous liners. When changing them, the waste bags are doubly sealed with a crimping tool or other type of tool, such that the waste materials, which may contain, among other things, vapors and aerosols, cannot escape from the waste bag or the hood interior 19.

Figure 7:
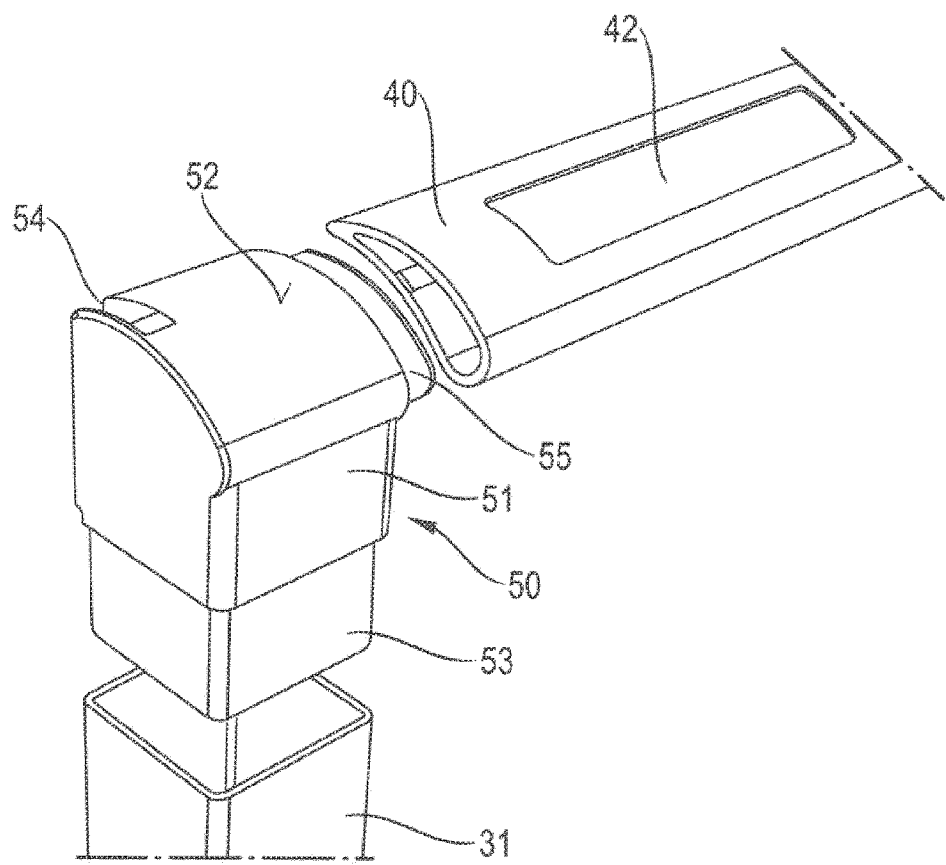
FIG. 7 shows a perspective illustration of a corner profile.

As is shown in FIG. 1, corner profiles 50, which shall be explained in greater detail in reference to FIG. 7, each connect a lateral wall 15 and an end of the armrest 40 to the support 30, or one of the legs 31 thereof.

The lower edge of the lateral wall 15, which, like the upper part 12 and the front plate 14 is preferably made of acrylic glass, is likewise framed in a profile 18 preferably made of metal. This profile 18 lies on the cross brace 32 located below it in the assembled state.

It can likewise be seen in FIG. 1 that the work surface 20 has a rise or bead on the edge. This bead, which is not provided with a reference symbol here, preferably runs over the entire circumference of the work surface and prevents liquids or powders that can trigger a poisonous or chemical reaction when unintentionally spilled, from spilling over the edge of the work surface, instead retaining these liquids or powders on the work surface 20.

The work surface 20 preferably has a monolithic structure, and is preferably made of a technological ceramic. The weight of the work surface 20 is preferably (depending on the size) in a range of 40 kg to 60 kg. In order to seal the work space 19, an elastic joint seal is provided between the work surface 20 and the deflector wall 16, as well as between the work surface 20 and the lateral walls 15 on the edges of the two lateral edges, as well as at the back surface.

The room air, or ambient air, which enters through both the air passage between the armrest 40 and the work surface 20 as well as through the work opening 11 in the work space 19, is vacuumed into the hollow space 16c in the deflector wall 16 through the slots (not shown) provided in the wall element 16b with the aid of the ventilator 70. As can be seen in FIG. 2, the air vacuumed off in this manner passes through an opening 16d in a preferably tube-shaped connecting flange or support element 61 (FIG. 8), and thus into the filter 61. After the exhaust air has been purified by the filter 62, it flows downward through an opening 69 in the exhaust air filter housing 65, toward a ventilator 70, through the hose 80, and passes through the exhaust outlet 90 into the laboratory space (FIG. 1).

All of the components of the exhaust air filter system 60, the ventilator 70, the hose 80 and the exhaust outlet 90 are preferably disposed beneath the work surface 20. All of these components of the weighing hood 1 can be attached to the support 30 or on a downward extending extension of the deflector wall 16 (FIG. 1).

In referring again to FIG. 1, there is a light source for illuminating the work surface 20 and preferably the entire work space 19, which is disposed in the hinge 13 according to one aspect.

Figure 3:
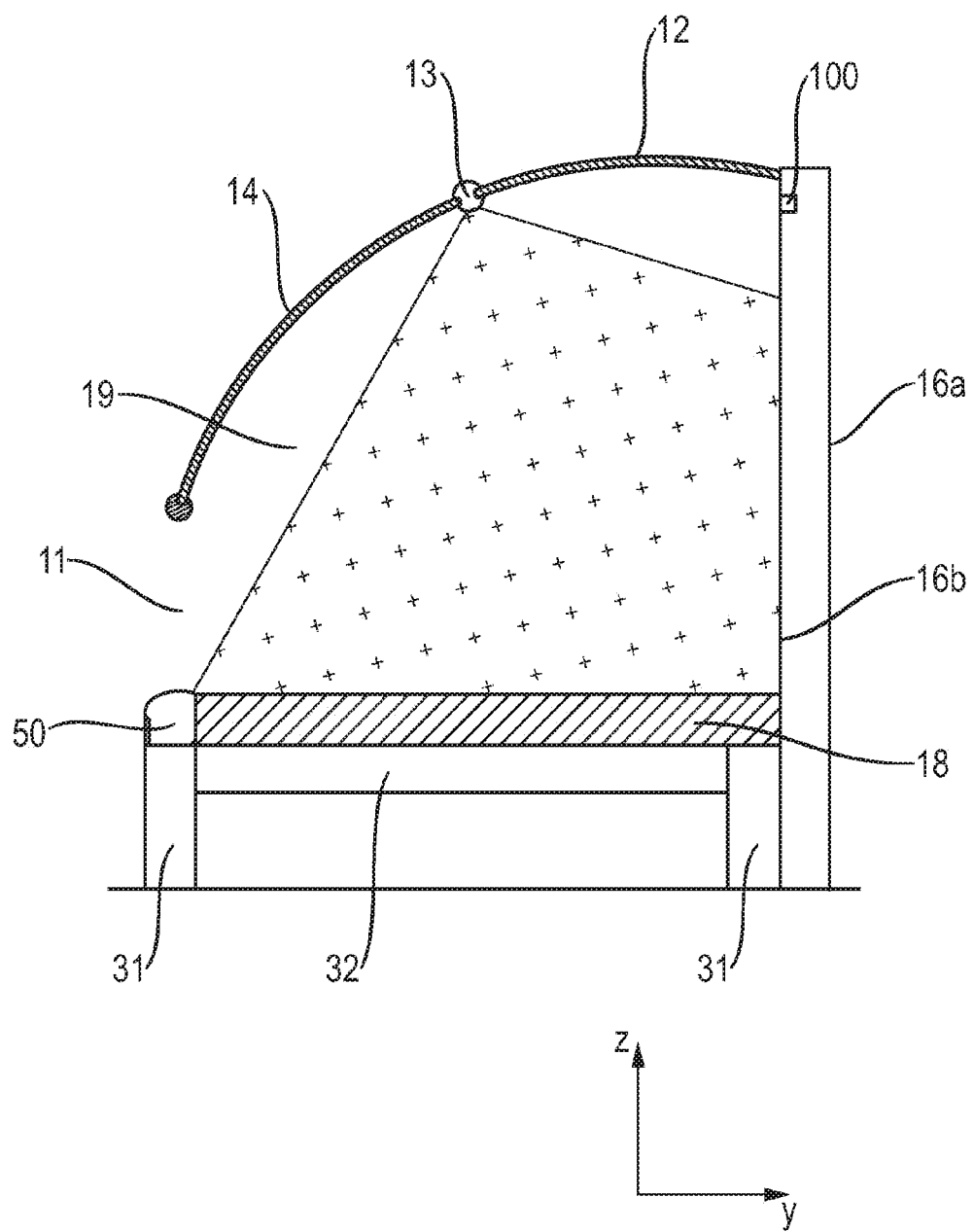
FIG. 3 shows a sectional view of the work space located inside the housing.

As can be seen in FIG. 3, the light source illuminates the relevant part of the work space 19 for all work processes, as well as the entire work surface 20. The hinge 13, which is likewise shown in FIG. 4, has a three-piece, preferably cylindrical body, which preferably has a constant diameter over the entire length (x-axis) of the hinge 13. As can be seen in FIG. 1 and FIG. 3, the hinge is self-supporting, and couples the front plate 14 to the upper part 12 in a pivotal manner. The upper part 12 and the front plate 14 are connected to the hinge 13 via adjustable, force-fitting clamp connections. Because the clamping force is adjustable, the assembly of the weighing hood 1 is significantly simplified.

At least one light source is integrated in the hinge 13, which preferably comprises at least one LED strip, which preferably extends over at least 75% of the width, or length (x-axis) of the hinge 13.

Figure 4:
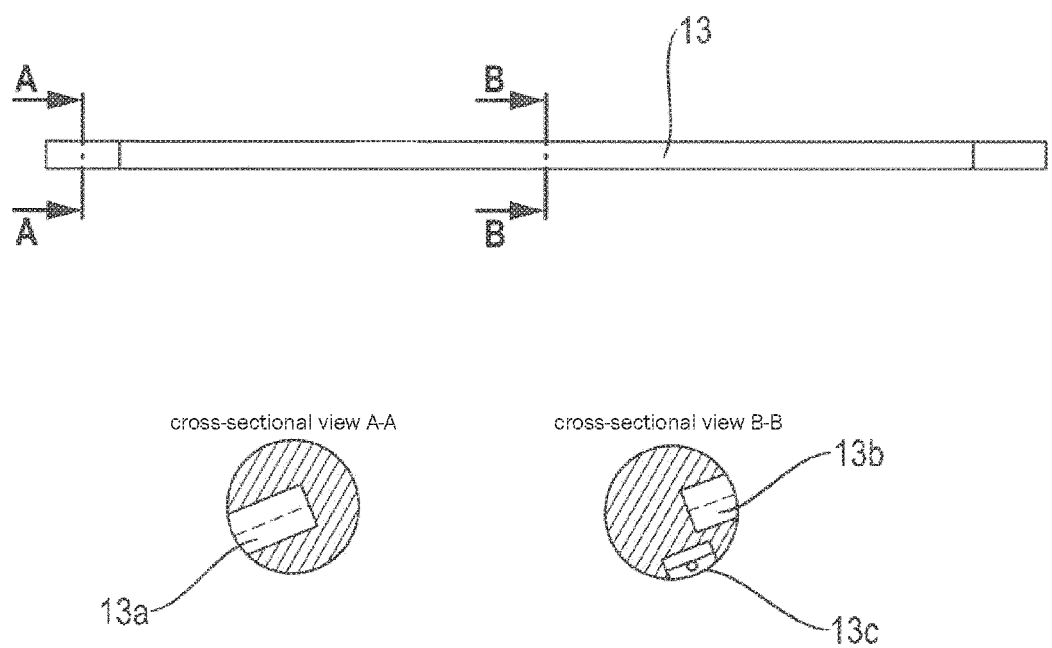
FIG. 4 shows a top view and two sectional views cut along the lines A-A and B-B of the hinge.

As can be seen in FIG. 4, the stationary section of the hinge 13 (cut A-A) has a recess 13a, in which the upper part 12 is received in a force-fitting manner. The pivotal section of the hinge 13 (cut B-B) in contrast, has two recesses, one recess 13b for the force-fit accommodation of the front plate 14, and the other recess 13c for receiving the light source.

Preferably, two LED strips are provided in the recess 13c, their color temperature is mixed, and depending on the requirements can each have a different kelvin number (color temperature).

Preferably, one LED strip has a color temperature of 3000 K, while the other LED strip has a color temperature of 6000 K. By mixing the colors of the two LED strips, various light temperatures can be generated in the work space 19, e.g. warm white (3000 K), neutral white (4500 K) or daylight white (6000 K).

Such defined light temperatures are necessary, for example, for identifying the colors of pharmaceutical substances. The color of the pharmaceutical substance that is to be weighed is preferably compared with a calibrated color card at a defined light temperature, thus determining the color of the pharmaceutical substance.

The light source or the preferably at least one LED strip is encapsulated in a transparent protective tube, preferably made of plastic. On one hand, this provides a chemical protection against aggressive substances that are handled in the work space 19. On the other hand, a cleaning and decontamination of the work space 19 is facilitated thereby, because the danger of a short circuit to the light source supplied with an electrical voltage is prevented.

A preferred rotational brake is contained in the hinge, which is not shown in the Figures. Numerous rotational brakes can also preferably be provided, depending on the weight of the front plate 14. As a result of such rotational brakes, the opened front plate 14 can automatically return, in a braked manner, to the closed position, and does not simply fall down, which could lead to damage, or injury to the operating personnel.

Likewise not shown in the Figures is an angle limiter, which limits the upward opening angle of the front plate 14, and thus defines the maximum open position of the front plate 14. This angle limiter is like a stop, and is preferably set such that the maximum open position of the front plate 14 is that position in which the front plate 14 can remain in a delicate balance. Alternatively, and also preferably, a catch can also be provided (not shown), which locks the front plate 14 in the maximum open position.

Figure 5:
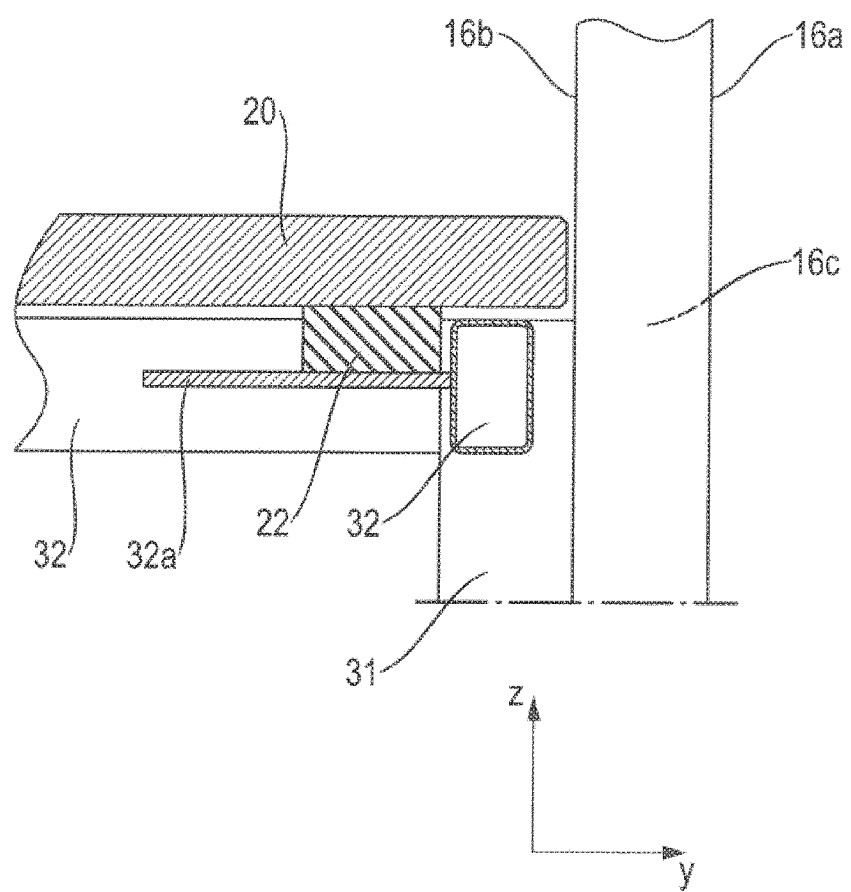
FIG. 5 shows a sectional view of the work surface in the region of the deflector wall.

FIG. 5 is a sectional view of the work surface 20 in the region of the double-walled deflector wall 16, which has two walls 16a, 16b that are spaced apart, which define an exhaust air channel between them. A section of a rear leg 31 and a cross brace 32 can likewise be seen. Another cross brace 32 is indicated by a rectangular double line with rounded corners, which runs perpendicular to the image plane (x-axis). A support or a brace 32a is connected to both the brace 32 extending in the y-direction as well as to the brace 32 extending in the x-direction. It is preferably connected thereto by a welded connection. There is a resilient element 22 located on the support 32a, preferably made of a rubber or a resilient plastic. The work surface 20 rests on the resilient element 22. The work surface 20 lies thereon, in accordance with another aspect, such that it is not in direct contact with the cross braces 32, which are part of the support 30, and the wall 16b.

Figure 6:
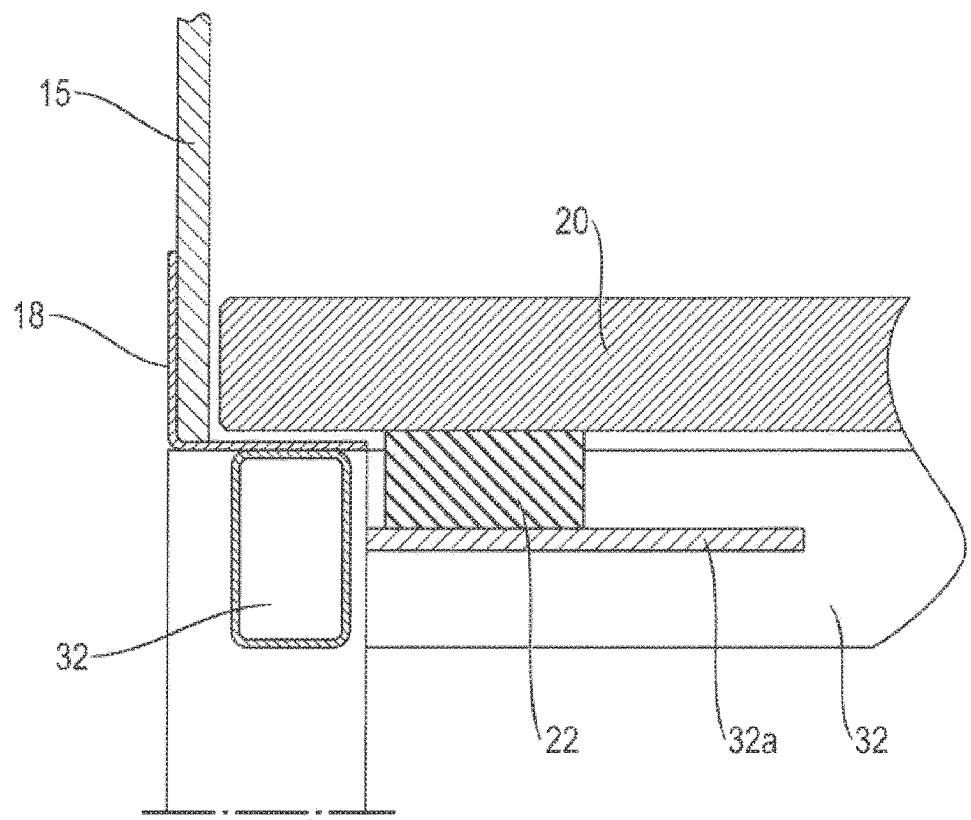
FIG. 6 shows a sectional view of the work surface in the region of a lateral wall.

FIG. 6 likewise shows, in a sectional view, the work surface 20 in the region of a cross brace 32 running in the x-direction, and a lateral wall 15. A support, or a brace 32a can also be seen here, which is connected to the cross brace 32 serving to stabilize the support 30. Here as well, a welded connection is preferably used. A section of a lateral wall 15 and the profile 18, which frames the lower end region of the lateral wall, can likewise be seen. The work surface 20 bears on a resilient element 22 here as well, preferably made of rubber or a resilient plastic. The work surface 20 also does not come in direct contact in this region with the lateral wall 15, the profile 18, a cross brace 32, or the leg 31 according to another aspect of the invention.

While FIG. 5 shows the right rear corner region of the work surface 20 shown in FIG. 1, and FIG. 6 shows the left front corner region of the work surface 20 shown in FIG. 1, the same arrangement applies for the right front corner region of the work surface 20 and the left rear corner region of the work surface 20.

Because the work surface 20 rests on a resilient element 22 according to this further aspect, and has no direct contact to any of the components of the support 30, the deflector wall 16 or the armrest 32, the work surface 20 is entirely decoupled from impacts and vibrations, such that any contact by the laboratory technician with a component of the weighing hood, e.g. with the armrest 40 and the front plate 14, has no effect on any weighing results. Vibrations potentially caused by the ventilator 70, and continuing over the exhaust air filter system 60 and the deflector wall 16, are thus not transferred to the work surface 20. The work surface 20 is likewise decoupled from any building vibrations. If the laboratory in which the weighing hood 1 is installed is located in a higher floor in which building vibrations are stronger, the work surface 20 can be entirely decoupled from the impacts and vibrations of such building vibrations through the selection of a resilient element having a lower damping constant, e.g. a gas spring. As a matter of course, a gas spring can also be adjusted such that it sufficiently absorbs other types of vibrations.

A perspective illustration of a node profile or corner profile 40 according to a further aspect is shown in FIG. 7, by means of which the armrest 40, one of the lateral walls 15, and the support 30, preferably the leg 31 here, are interconnected. The directional information given below relates to a corner profile in the region of the left front corner region of the weighing hood 1.

The corner profile 50 has a base section 51, from which a projection 53 extends downward, in the z-direction, the dimensions of which in turn are selected such that it can fit into the leg 31 designed as a hollow profile. Moreover, the corner profile 50 has a slot-shaped recess 54 running in the z-direction, the depth of which (y-axis) is selected such that it is suitable for the form-fitting accommodation and stable retention of the lateral wall 15. A pin-like projection 55 extends in the x-direction away from the upper end section of the corner profile 50, the dimensions and cross section of which are selected such that it can fit into the armrest 40, which is airfoil-shaped and designed as a hollow profile. The flow-optimized airfoil shape of the armrest 40 can be clearly seen in FIG. 7.

As is describe above, the surface of the armrest 40 facing the work opening 11 is flow-optimized and has a convex design. It can be seen in FIG. 7 that the upward (z-direction) facing surface 52 of the corner profile 50 has a correspondingly flow-optimized and convex contour. As a result, a flush, smooth transition is ensured between the surface 52 of the corner profile 50 and the surface of the armrest 40. Thus, the air supply can flow in the region of the corner profile 50 with low turbulence, through the work opening 11 and into the work space 19.

As can be seen in FIG. 1, such corner profiles 50 are provided in the left front as well as in the right front corner regions of the weighing hood 1.

Such corner profiles 50 in accordance with this aspect simplify not only the construction of the weighing hood 1, but they also offer advantages regarding the necessary regular cleaning and decontamination of the weighing hood 1, because there are no ledges, difficult to access locations, or any open recesses that are difficult to clean. In addition, corner profiles 50 designed in this manner ensure a low-turbulence inflow of the ambient air into the work space 19 in the regions of the corner profiles 50.

A control and/or display panel 42 in accordance with a further aspect can likewise be seen in FIG. 7, which is fully integrated in the armrest 40. The control and/or display panel 42 is incorporated in the armrest 40 such that it is flush therewith, and protected from liquids. Any electrical lines, which provide the control and/or display panel with current, or any data lines, can run entirely inside the armrest 40. As a result, they cannot be seen from the exterior, nor do they complicate the cleaning of the weighing hood 1.

The display and/or control panel 42 can preferably only have display elements on which various control functions of the weighing hood 1 are displayed. It can, however, also be a combined panel comprising control and display elements 42, via which various functions of the weighing hood can also be controlled. An acoustic or visual warning signal can also be issued via the panel 42.

The display and control panel 42 preferably comprises five illuminated capacitive touchpads, and one acoustic warning sound emitter. All of the operating states of the weighing hood can be displayed and activated in an ergonomically beneficial manner. The laboratory technician, usually sitting in front of the weighing hood 1, can thus preferably control all of the functions of the weighing hood via the panel 42, and likewise have them displayed there, without having to substantially change his sitting position, let alone stand up.

Because the display and/or control panel 42 comprises capacitive touchpads, an unintentional touching of one of the touchpads with a forearm, which is usually covered by clothing that poorly conducts electricity, and normally lies on the armrest 40, causes no activation of the touchpad, and thus no change to the operating state of the weighing hood 1. The touchpads preferably comprise, e.g., "weighing hood on/off," "light on/off," light temperature 3000 k/4500K/6000K," "alarm," "change filter."

Figure 8:
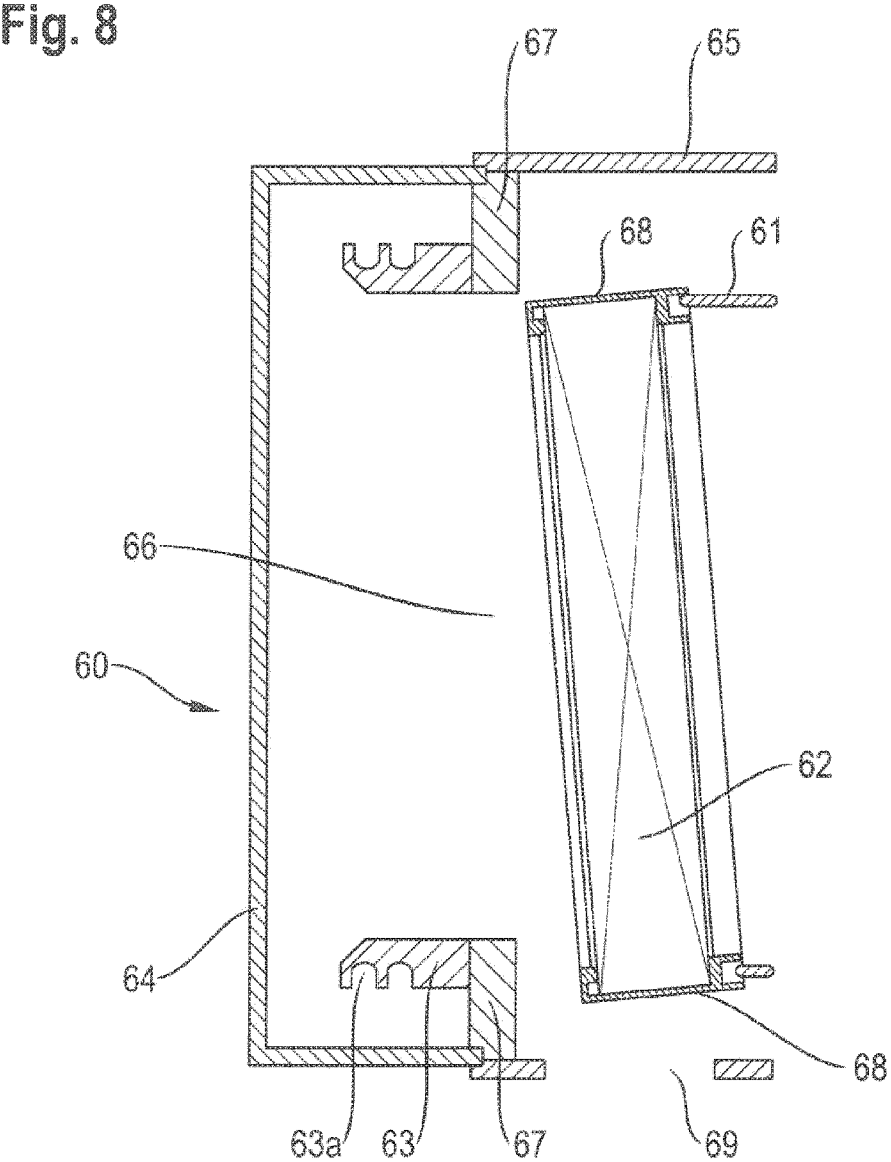
FIG. 8 shows a sectional view of the exhaust or circulation air filter system.
Figure 9:
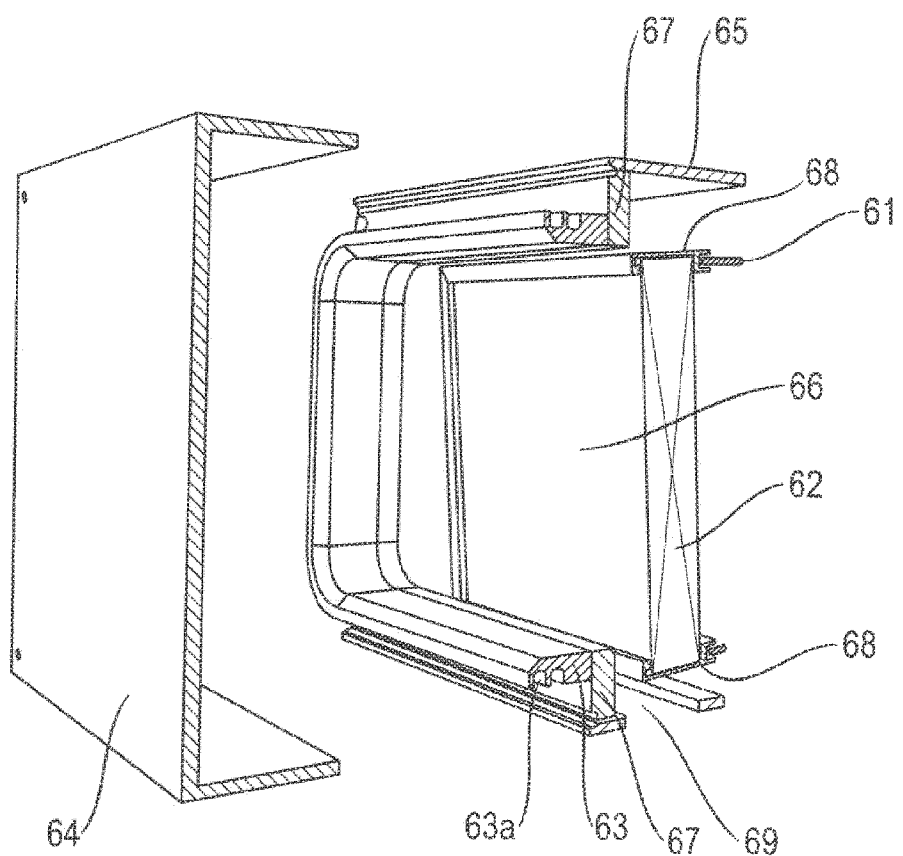
FIG. 9 shows a perspective exploded view of the exhaust or circulation air filter system shown in FIG. 8.

FIG. 8 shows a sectional view through the exhaust air filter system 60, while FIG. 9 shows the exhaust air filter system 60 in a perspective, exploded view in accordance with a further aspect. A connecting flange, or a tube-shaped support element 61, which is supplied with exhaust air fed through the hollow space 16c in the deflector wall 16, has an end section with a conical design. In other words, the annular end surface, facing toward the left in FIG. 8, is tilted in relation to an orthogonal disposed in relation to the tube axis. The tilting angle is preferably in a range of 5° to 45°, more preferably in a range of 5° to 15°, and it is further preferred that the tilting angle is 5°.

A filter 62 is disposed upstream of the tube-shaped support element 61, which is supported in a groove-shaped receiver 68. This groove-shaped receiver 68 is connected in turn to the end section of the tube-shaped support element 61, such that at least the unfiltered air side (and preferably the purified air side) of the filter 62 is tilted. This tilting angle preferably corresponds to the tilting angle of the end surface of the tube-shaped support element 61. Both the tube-shaped support element 61 and the filter 62, as well as the groove-shaped receiver 68 are contained in a housing 65. An opening 69 is provided on the undersurface of the housing 65, which is in a fluid connection with the ventilator 70 (FIG. 2).

A waste bag attachment 63 is likewise attached to the housing 65. This waste bag attachment 63 is used when changing filters 62. Otherwise, it is covered by a releasable flap 64.

Because the filter 62 is not vertically (z-axis) oriented, but instead is at an acute angle to the vertical, a releasing of particles on the unfiltered air surface of the filter, through shaking and gravity continuously acting thereon, and their falling through the opening 69, is prevented during the changing process through this tilted alignment, from where these particles could then end up, unobstructed, in the laboratory space.

Another advantage of the exhaust air filter system 60 shown in FIG. 8 and FIG. 9 is in the vertical offset 67, which is preferably an integral component of the waste bag attachment 63, and preferably defines the exhaust air filter removal opening 66, through which the exhaust air filter 62 must ultimately pass. The exhaust air filter removal opening 66 has a height (z-axis) that is less than the height (z-axis) of the filter 62 as such. In other words, the vertical filter height, meaning the actual height, and not the height of the filter 62 when it is tilted at a specific angle, is greater than the height dimension of the exhaust air filter removal opening 66. Due to this size difference, the exhaust air filter 62 must be pivoted further in the horizontal when it is replaced, in order for it to pass through the exhaust air filter removal opening 66. This pivotal movement also contributes thereby to particles possibly adhering to the unfiltered air side of the filter, or any loose particles, remaining on the filter 62, and not falling downward unintentionally when changing filters.

The so-called "bag changing technique" is used for changing filters. For this, the cover 64 is removed from the housing 65, and a waste bag (not shown) is connected to a first groove 63a by means of an O-ring. Subsequently, the laboratory technician slides the waste bag attached to the waste bag attachment 63 to the right, toward the filter, subsequently releasing the filter 62 from the tube-shaped support element 61 with the bag in both hands, and moves the filter 62 to the left, until the bag, which was upended, so to speak, during the releasing of the filter 62, is again in its normal orientation. Subsequently, a second bag is likewise attached to the waste bag attachment 63 by means of an O-ring, outside the first bag. A fully contamination-free removal of the first bag from the waste bag attachment 63 is ensured through the use of the second bag. If the filter 62 is replaced in this manner, a new filter 62, including the groove-shaped receiver 68, is attached to the tube-shaped support element 61, and the cover is then reconnected to the housing in an airtight manner.

The filters 62 used here are preferably so-called suspended matter filters, in the category of HEPA filters ("High Efficiency Particulate Airfilter").

Furthermore, an additional filter may be provided in the discharge outlet 90. In this manner, the safety of the overall system is increased, if the (first) filter 62 shown in FIG. 8 and FIG. 9 should leak, as a result, e.g., of a breakage in the filter, or a handling error when changing filters.

According to a further aspect, a detection device 100 is contained in the deflector wall 16, as can be seen in FIG. 3. The detection device 100 is preferably an optoelectronic detection device, more preferably a laser diode and a photodetector. The laser diode and the photodetector are preferably combined to form a component, and are disposed such that a laser beam emitted by the laser diode can detect a rotational movement of the front plate 14, preferably the hinge 13.

The unit comprised of a laser diode and photodetector is active during operation of the weighing hood 1 in order to issue a warning signal, visible or audible, to the laboratory technician who unintentionally, or even intentionally, moves the front plate 14 away from the closed position while the weighing hood 1 is in use. As long as the front plate 14 is closed, and the hinge 13 does not move, the laser beam emitted by the laser diode is detected by the photodetector. If the photodetector fails to receive a laser beam for any reason, it is then concluded that the hinge 13 has rotated, and the front plate 14 must therefore have been moved upward. The photodetector then transmits a signal to a control device, not shown, which in turn causes a warning signal to be issued, in the case of a visible and acoustic warning signal, on the panel 42 in the armrest 40.

The aspects of the weighing hood 1 depicted in FIG. 1 described above, which relate to the impact and vibration decoupled support of the work surface 20 in the work space 19, the integration of the display and/or control panel 42 in the armrest 40, the integration of a light source in the hinge 13, the corner profile 50, the contamination-free changing of filters 62 in the exhaust air filter system 60, and the accommodation of a laser diode/photodetector in or on the deflector wall 16, may exist in combinations as well as individually and in any arbitrary permutation. The description of the Figures is not to be understood to mean that the weighing hood 1 must simultaneously include all aspects.

The features described above, of every aspect, can be combined arbitrarily. Even though a combination of individual features may appear to be technically absurd, the person skilled in the art will know which features can be combined with one another in a technically reasonable manner.

The invention claimed is:

1. A weighing hood for weighing pharmaceutically active or toxic substances in a laboratory, comprising:

a housing, which defines a work space, wherein a front surface of the housing has a work opening that is always open in an intended use of the weighing hood,
a work surface, which delimits the floor of the work space,
an armrest in the region of the work opening, and
a support, which supports the weight of the housing, the work surface, and the armrest, wherein the work surface is decoupled from the housing, the armrest, and the support with regard to impacts and vibrations.

2. The weighing hood according to claim 1, wherein there is no direct contact between the work surface and (i) the housing, (ii) the armrest, and (iii) the support.

3. The weighing hood according to claim 1, wherein there is no releasable force-fitting, form-fitting, or material-bonding between the work surface and (i) the housing, (ii) the armrest, and (iii) the support.

4. The weighing hood according to claim 1, wherein the work surface rests exclusively on the support such that it is decoupled from impacts and vibrations.

5. The weighing hood according to claim 1, wherein a least one resilient element is provided between the support and the work surface on which the work surface rests.

6. The weighing hood according to claim 5, wherein the resilient element is produced from rubber or an elastic plastic.

7. The weighing hood according to claim 1, wherein the support is configured such that it provides a resilient 3-point or 4-point support for the work surface.

8. The weighing hood according to claim 1, wherein the work surface is monolithic, and has a weight in a range of 40 kg to 60 kg.

9. The weighing hood according to claim 1, wherein the housing and the armrest rest exclusively on the support.

10. The weighing hood according to claim 5, wherein the support has at least one brace, and the resilient element is disposed between the brace and the work surface, and wherein the brace is disposed such that a work area of the work surface lying on the resilient element is flush with the surface of the support.

11. The weighing hood according to claim 1, wherein an elastic joint seal is provided along the lateral and rear circumference of the work surface.

* * * * *